United States Patent [19]

Hunsucker

[11] Patent Number: 4,502,792

[45] Date of Patent: Mar. 5, 1985

[54] APPARATUS FOR CALIBRATING A PYROMETER

[75] Inventor: Paul D. Hunsucker, Katy, Tex.

[73] Assignee: Shell Oil Company, Houston, Tex.

[21] Appl. No.: 450,829

[22] Filed: Dec. 20, 1982

[51] Int. Cl.³ .................................... G01K 15/00
[52] U.S. Cl. .................................... 374/1; 250/252.1
[58] Field of Search .................. 374/1, 2, 179, 164, 374/129, 6; 250/252.1; 136/230; 356/243

[56] References Cited

U.S. PATENT DOCUMENTS

| | | | |
|---|---|---|---|
| 3,075,387 | 1/1963 | Rademacher | 136/230 X |
| 3,313,140 | 4/1967 | Trementozzi | 374/2 |
| 3,350,915 | 11/1967 | Staffin | 374/3 |
| 3,434,349 | 3/1969 | Frischmann | 374/179 X |
| 3,776,039 | 12/1973 | Bowen | 374/1 X |
| 4,144,758 | 3/1979 | Roney | 374/129 X |
| 4,387,301 | 6/1983 | Wirick et al. | 250/252.1 |
| 4,411,523 | 10/1983 | Loftus et al. | 374/139 X |
| 4,433,924 | 2/1984 | Quinn | 374/129 X |

FOREIGN PATENT DOCUMENTS 1319865 6/1973 United Kingdom ............... 374/164

Primary Examiner—Daniel M. Yasich

[57] ABSTRACT

An apparatus for calibrating a pyrometer for measuring the temperature of a body in a furnace comprising: a housing having substantially the same emissivity as the body and having a channel therein; a first temperature sensing means positioned at a first predetermined point in the housing; a second temperature sensing means positioned at a second predetermined point in the housing; and an elongated member being suitable for holding by an operator and having a bore adapted to be connected to a fluid supply means, the elongated member being attached to the housing such that the bore is in communication with the channel.

12 Claims, 5 Drawing Figures

APPARATUS FOR CALIBRATING A PYROMETER

BACKGROUND OF THE INVENTION

This invention relates to an apparatus for calibrating a pyrometer for measuring temperatures in a furnace and, more particularly, to an apparatus for calibrating a pyrometer for measuring the surface temperature of furnace tubes.

Two types of pyrometers that are used to measure the temperature in process furnaces are the optical and infrared radiation pyrometers. In the optical type a small wire, which is heated by a calibrated variable current, is superimposed on the image of the object to be measured. The current provided to the wire is varied until the color of the wire matches the color of the object to be measured. The current is then read from a dial calibrated in temperature units. The infrared type of pyrometer gathers radiation from the object of interest and focuses it on an element which converts the radiation to a current or voltage signal. This signal, which can be biased to compensate for the emissivity of the object to be measured, is amplified and provided to a meter. Although such pyrometers provide an improvement over the prior art temperature measurement techniques, it has been found that the accuracy available with such units is unsuitable for certain applications. For example, in a pyrolysis furnace, measurement of the temperature of the surface of the furnace tubes is used to detect the presence of hot spots caused by coke formations or other residue inside the tube. These formations decrease the heat transfer of the tube wall, thus allowing the temperature of the tube to approach that of the furnace wall. Heating of the tube beyond its tolerance limits can cause it to rupture. Generally, the most efficient operation of the furnace requires that the furnace tubes be operated near their maximum temperature limit which increases the possibility of overheating and rupturing of a tube. However, to prevent any possibility of damage to the furnace prior art workers have typically provided a margin of safety by operating the furnace at less than maximum temperature to allow for the inaccuracies encountered with the prior art pyrometers, thereby reducing the efficiency and productivity of the furnace.

Therefore, it is an object of the present invention to provide an apparatus for calibrating a pyrometer for measuring the temperature of a furnace tube or other body in a furnace.

SUMMARY OF THE INVENTION

In accordance with the present invention there is provided an apparatus for calibrating a pyrometer for measuring the temperature of a body in a furnace. The calibrating apparatus comprises a housing or target portion at which the pyrometer is aimed. The housing has a first temperature sensing means, such as a thermocouple, positioned at a first predetermined point and a second temperature sensing means positioned at a second predetermined point. Preferably, the first temperature sensing means is positioned near the surface of the housing, and the second temperature sensing means is positioned approximately halfway through the wall of the housing. The housing has a channel therein and substantially the same emissivity as the body whose temperature is to be measured. For example, if the temperature of a furnace tube is to be measured, the calibration apparatus should be made of a material similar to typical furnace tube material since this will provide an oxidized surface with an emissivity close to that of furnace tubes. In addition, preferably the housing has a shape similar to that of the body whose temperature is being measured. An elongated member, which is suitable for holding by an operator and which has a bore, is connected to the housing such that the bore is in communication with the channel. The bore is adapted to be connected to a fluid supply means, such as an air supply, to provide fluid through the bore to the channel. Preferably, the calibrating apparatus has a valve for modifying the amount of fluid flowing through the bore to modify the temperature of the housing, thereby allowing the temperature of the housing to be adjusted. The elongated member or handle can be provided with an additional cooling means, such as a pipe in contact with the member, which is connected to a fluid supply means. This additional cooling ensures that the handle will not sag under the extreme temperature conditions of the furnace and that the handle can be grasped by an operator using normal safety precautions. The fluid that is used for cooling the housing can be vented through an aperture in the housing into the furnace rather than returning it through the handle; however, the air should be vented such that it does not interfere with the surface temperature of the housing. This can be accomplished, for example, by venting the fluid on either the top or bottom or both of the housing. In addition, there can be a plurality of channels in the housing to ensure that the cooling fluid inside of the housing has a uniform distribution to provide uniform cooling of the measurement surface. An improved heat exchange area can be created within the channel by providing the channel with screw threads.

The operation of the calibration apparatus of the present invention in calibrating a pyrometer to measure the surface temperature of a furnace tube is described as follows. The housing or target portion of the calibration apparatus is inserted into the furnace through a peep sight or inspection door so that it can be viewed from another peep sight or inspection door. Preferably, the target should be positioned near the furnace tube which is to be measured to approximate the same environment as the tube. An insulation blanket or plate should be placed around the elongated member or handle to minimize cold air leakage into the furnace. Similarly, the same consideration should be given to minimizing cold air flow into the port used to view the target, since cold air flows can appreciably affect temperature readings. The leads from the temperature sensing means are connected to a voltmeter, and an air supply is connected to the bore of the handle and to the means for cooling the handle. The valve of the cooling means is adjusted so that air flows therethrough to cool the handle. The voltmeter is monitored to determine when both temperature sensing means indicate the same temperature, thereby indicating that the target has reached temperature equilibrium. The pyrometer under test can be calibrated using this maximum temperature or, preferably, it can be calibrated at a lower temperature which is near the tube temperature. The temperature of the target is varied by opening the valve associated with the bore to allow air to flow through the bore of the handle to the channel in the target. During the cooling of the target, the temperature of its surface is higher than indicated by the temperature sensing means. The actual temperature of the surface is approximated by extrapolating the readings of the temperature sensing means according to their distance from the surface; this actual temperature is compared to the temperature measured by the pyrometer on the surface of the target to determine the correction factor that should be applied to the pyrometer.

Accordingly, the calibration apparatus of the present invention provides a direct comparison between the temperature readings of the pyrometer under calibration and the temperature sensing means. The shape, material and location of the target eliminate uncertainty due to emissivity settings on the pyrometer and furnace geometry and provide an improvement in determining the actual temperature of the surface of a furnace tube or other body at any specific location under a given set of furnace operating conditions. In addition, the calibration apparatus can be used as a standard reference which is adaptable to a wide range of applications.

Other objectives, advantages and applications of the present invention will be made apparent by the following detailed description of the preferred embodiments of the present invention.

DETAILED DESCRIPTION OF THE PREFERRED EMBODIMENTS

Figure 1:
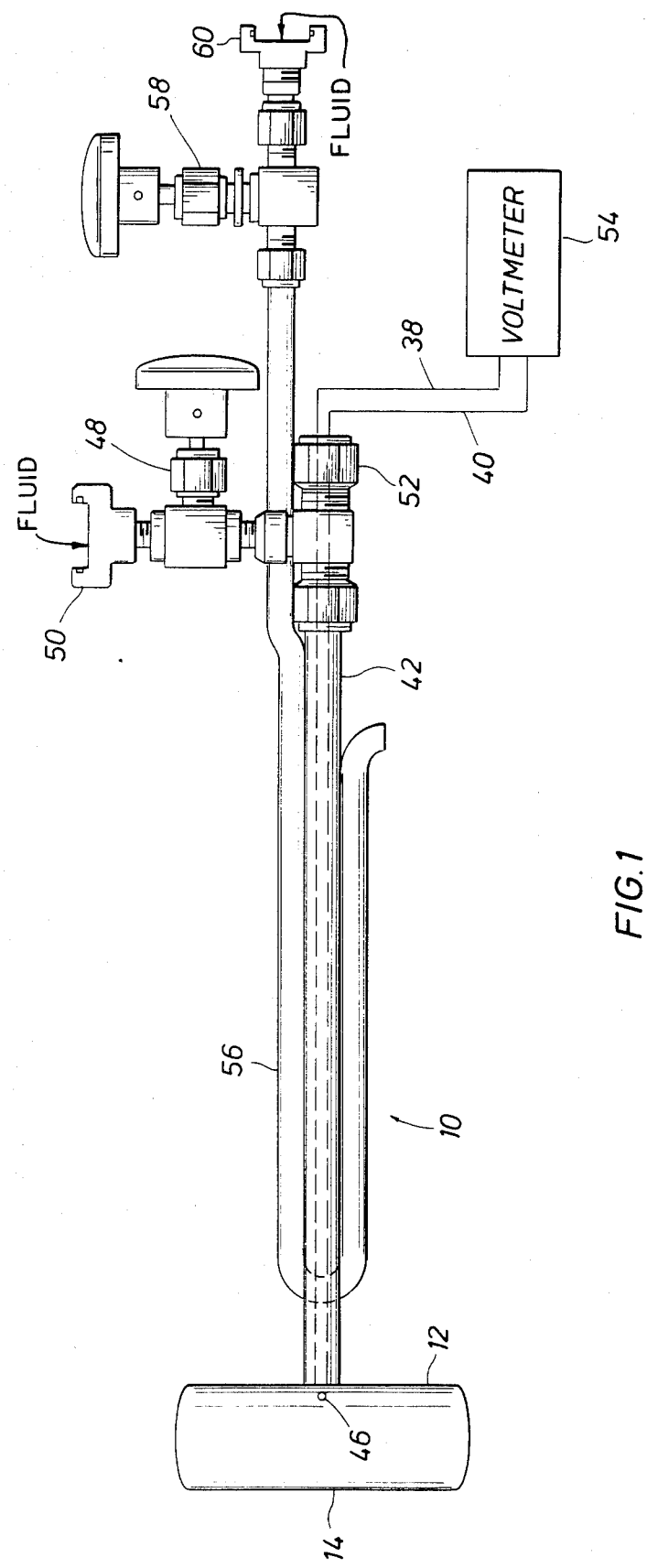
FIG. 1 is a side view in elevation of the calibration apparatus of the present invention.
Figure 4:
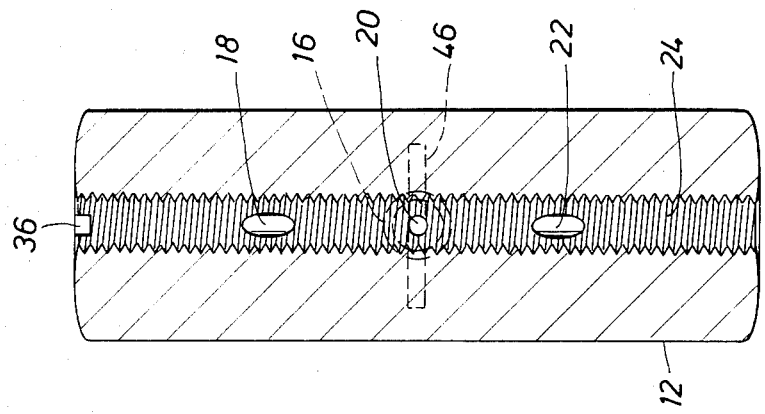
FIG. 4 is a cross section of the target portion of the calibration apparatus of the present invention taken along line 4—4 of FIG. 3.
Figure 3:
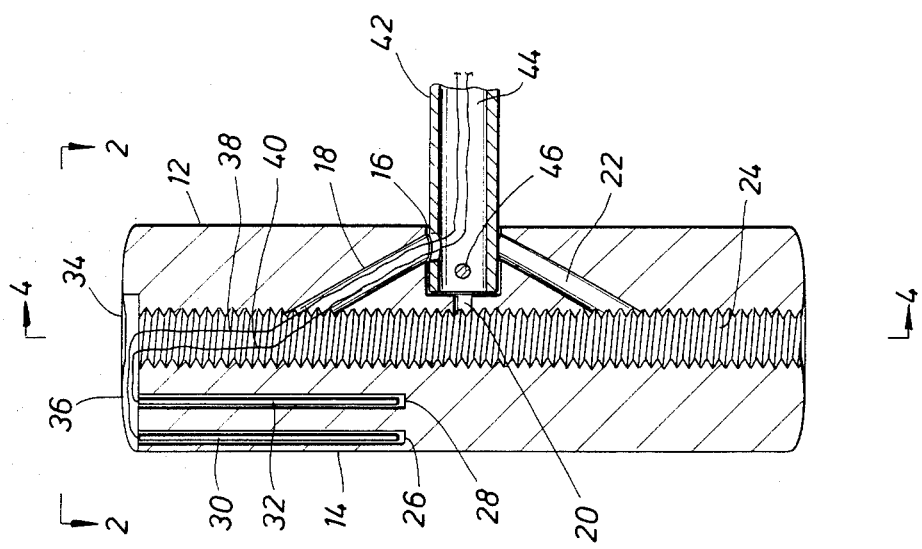
FIG. 3 is a cross section of the target portion of the calibration apparatus of the present invention.
Figure 2:
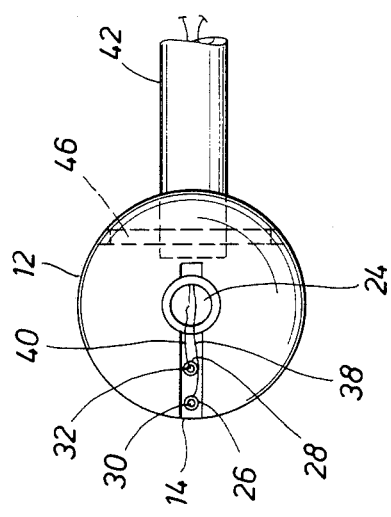
FIG. 2 is a detailed plan view of the target portion of the calibration apparatus shown in FIG. 1.
Figure 5:
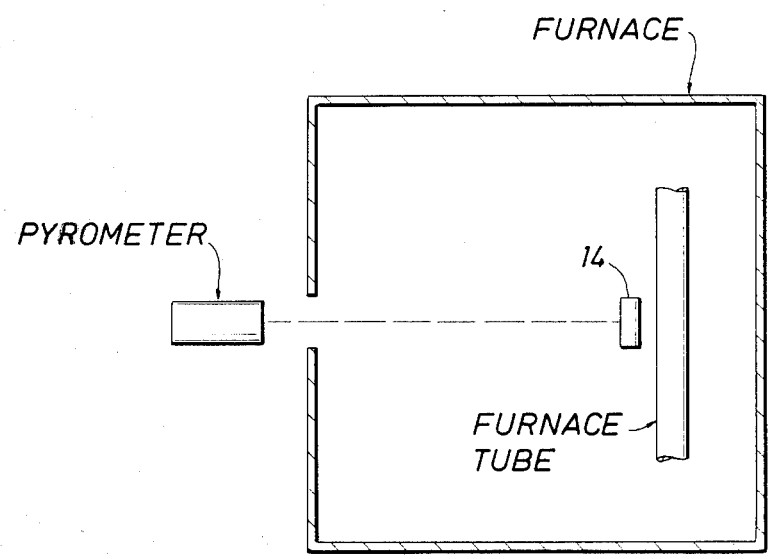
FIG. 5 shows the calibration of the invention.

Referring to FIGS. 1-4, the embodiment of the calibration apparatus of the present invention for calibrating a pyrometer for measuring the temperature of a cylindrical furnace tube is indicated generally by numeral 10. Calibration apparatus 10 has a cylindrical body 12 which is the target or portion at which the pyrometer under calibration is aimed. In particular, the pyrometer is aimed at surface 14 of body 12. Body 12 should be made of substantially the same material as the furnace tube that is to be measured, for example, Inconel, and should be suitably sized to fill the effective field of view of the pyrometer under calibration. It has been found that a cylinder having a 1.5 inch diameter and 4.5 inch length is sufficient for use with both optional and infrared pyrometers at distances of up to 10 feet. Body 12 has an aperture 16 that is in communication with channels 18, 20 and 22. Channels 18, 20 and 22 are in communication with center channel 24 which runs through the entire length of body 12. Center channel 24 can be provided with screw threads to increase the overall surface area thereof to provide the maximum amount of cooling of body 12 as discussed hereinbelow. End 34 of body 12 has a cavity 26, which is located near surface 14, and a cavity 28, which is positioned approximately halfway between surface 14 and center channel 24. Thermocouple 30 is positioned in cavity 26, and thermocouple 32 is positioned in cavity 28. It should be noted that thermocouples 30 and 32 can be positioned at other locations and that more than two termocouples can be used. Both the inside and outside edges of body 14 are rounded to eliminate the possibility of hot spots on the corners. End 34 of body 12 is provided with a slot 36 to provide a recess for wires 38 and 40 from thermocouples 30 and 32 respectively. Preferably, thermocouples 30 and 32 should have an Inconel sheath for protection from heat and corrosion.

An elongated member 42 having a bore 44 is connected to body 12 such that bore 44 is in communication with aperture 16. Member 42 can be connected to body 12 by any suitable means, such as welding or pin 46. If desired, member 42 can be bent at an angle, such as 90° or 180°, to facilitate viewing thereof from an available peep sight or inspection door in the furnace. Valve 48, which is connected to the other end of member 42, has a connector 50 and a connector 52. Connector 50 is adapted to be connected to a fluid supply means, such as an air hose from an air supply. Connector 52 is sealed with a plug made of, for example, Teflon, to prevent air from escaping therethrough; the plug has two apertures to accommodate wires 38 and 40. Wires 38 and 40 from thermocouples 30 and 32 are passed through slot 36, center channel 24, channel 18, aperture 16, bore 44 and connector 52 to voltmeter 54. A U-shaped tube 56 is attached to member 42 by welding or the like such that the rounded portion of tube 56 is positioned nearer to body 12 than the ends of tube 56. One end of tube 56 is connected to valve 58 which has a connector 60 that is adapted to be connected to a fluid supply means, such as an air supply. The other end of tube 56 is open so that the air can pass through tube 56 and be exhausted therefrom.

Referring to FIGS. 1-4, the operation of calibration apparatus 10 in calibrating a pyrometer to measure the surface temperature of a furnace tube is described as follows. Body 12 is inserted into the furnace through a peep sight or inspection door so that surface 14 of body 12 can be viewed through another peep sight or inspection door. Preferably, body 12 should be positioned near the surface tube which is to be measured to approximate the same environment as the tube. The distance from the pyrometer under calibration to body 12 should be minimized to permit body 12 to fill the field-of-view of infrared type pyrometers. An insulation blanket or plate should be placed around member 42 to minimize cold air leakage into the furnace. Similarly, the same consideration should be given to minimizing cold air flow into the port used to view body 12, since cold air flows can appreciably affect temperature readings. Wires 38 and 40 from thermocouples 30 and 32 respectively are connected to voltemter 54, and an air supply is connected to connectors 50 and 60. Valve 58 is adjusted so that air flows through tube 56 to cool member 42. Voltmeter 54 is monitored to determine when thermocouples 30 and 32 indicate the same temperature thereby indicating that body 12 has reached temperature equilibrium. The pyrometer under test can be calibrated using this maximum temperature of body 12, or, preferably, can be calibrated at a lower temperature which is near the tube temperature. Modifying the temperature of body 12 is accomplished by opening valve 48 to allow air to flow through bore 44 of member 42 to aperture 16 of body 12 from which it passes through channels 18, 20 and 22 into center channel 24 from which it is exhausted. During the cooling of body 12, the temperature of surface 14 is higher than indicated by thermocouples 30 and 32. The actual temperature of surface 14 is approximated by extrapolating the readings of thermocouples 30 and 32 according to their distance from surface 14. Accordingly, calibration apparatus 10 provides a direct comparison between the temperature readings of the pyrometer under calibration and thermocouples 30 and 32. The shape, material and location of body 12 eliminates uncertainty due to emissivity settings on the pyrometer and furnace geometry and provide an improved method of determining the actual temperature of the surface of furnace tubes and the like at a specific location under a given set of furnace operating conditions. In addition, calibration apparatus 10 can be used as a standard reference which is adaptable to a wide range of applications.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A method for calibrating an optical or radiation pyrometer used to measure a surface temperature of a furnace tube, comprising, inserting a target having cooling channels therein by means of a handle into the furnace near the furnace tube, whereby the target is in substantially the same furnace environment as the tube; controlling the temperature of the target by air flowing through said channels in the target, wherein said air is supplied to said channels by said handle at an adjustable rate; determining the surface temperature of the target with a thermocouple in the target and with said pyrometer; and comparing the temperature determined by said thermocouple to the temperature measured by the pyrometer on the surface of the target to determine a correction factor to be applied to the pyrometer.

2. The method of claim 1 wherein two thermocouples are employed, each located within the target at a different distance from the surface of the target, and from which the actual temperature of the surface of the target is approximated by extrapolating the temperature readings of the thermocouples according to the distance of each thermocouple from the surface of said target.

3. The method of claim 1 including cooling the handle by flowing air through a tube attached to the handle.

4. A method for calibrating an optical or radiation pyrometer used to measure a surface temperature of a body in a furnace, comprising, inserting a target into the furnace near the body in said furnace, whereby the target is in substantially the same furnace environment as the body; measuring the temperature of the target with a temperature sensing means in the target independent of the pyrometer; measuring the temperature of the target with said pyrometer; and comparing the temperature measured by said temperature sensing means to the temperature measured by the pyrometer on the surface of the target to determine a correction factor to be applied to the pyrometer.

5. The method of claim 4 wherein two temperature sensing means are employed, each located within the target at a different distance from the surface of the target, and from which the actual temperature of the surface of the target is approximated by extrapolating the temperature readings of the two temperature sensing means according to the distance of each temperature sensing means from the surface of said target.

6. An apparatus for calibrating an optical or radiation pyrometer for measuring a surface temperature of a furnace tube, comprising, a target having cooling channels therein insertable by means of a handle into the furnace near the furnace tube, whereby the target is in substantially the same furnace environment as the tube; means for controlling the temperature of the target by air flowing through said channels in the target wherein said air is supplied to said channels by said handle at an adjustable rate; thermocouple means in the target for measuring the temperature of the target; and means for comparing the measured temperature to the temperature detectable by the pyrometer on the surface of the target to determine a correction factor to be applied to the pyrometer.

7. The apparatus of claim 6 wherein the target has substantially the same emissivity as the tube.

8. The apparatus of claim 6 wherein said thermocouple means includes two thermocouples, each located within the target at a different distance from the surface of the target to facilitate approximation of the actual temperature of the surface of the target by extrapolation of the temperature readings of the thermocouples according to the distance of each thermocouple from the surface of said target.

9. The apparatus of claim 6 including means attached to the handle for cooling the handle.

10. An apparatus for calibrating an optical or radiation pyrometer for measuring a surface temperature of a body in a furnace, comprising, a target insertable into the furnace near the body in said furnace, whereby the target is in substantially the same furnace environment as the body; means in the target for determining the surface temperature of the target, which means is independent of the pyrometer; and means for comparing the measured temperature to the temperature detectable by the pyrometer on the surface of the target to determine a correction factor to be applied to the pyrometer.

11. The apparatus of claim 10 wherein said means for determining the surface temperature includes two temperature sensing means, each located within the target at a different distance from the surface of the target to facilitate approximation of the actual temperature of the surface of the target by extrapolation of the temperature readings of the temperature sensing means according to the distance of each temperature sensing means from the surface of said target.

12. The apparatus of claim 10 wherein the target has substantially the same emissivity as the body.

* * * * *